United States Patent
Li et al.

(10) Patent No.: US 12,552,728 B2
(45) Date of Patent: Feb. 17, 2026

(54) METHOD FOR PREPARING SELENIUM-WATER-SOLUBLE POLYSACCHARIDE HYDROGEL AND USE THEREOF IN SELENIUM ENRICHMENT IN PLANTS

(71) Applicant: SOOCHOW UNIVERSITY, Suzhou (CN)

(72) Inventors: Na Li, Suzhou (CN); Jian Zhu, Suzhou (CN); Lu Cao, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 773 days.

(21) Appl. No.: 17/909,968

(22) PCT Filed: Oct. 12, 2021

(86) PCT No.: PCT/CN2021/123186
§ 371 (c)(1),
(2) Date: Sep. 7, 2022

(87) PCT Pub. No.: WO2023/019704
PCT Pub. Date: Feb. 23, 2023

(65) Prior Publication Data
US 2024/0199506 A1    Jun. 20, 2024

(30) Foreign Application Priority Data
Aug. 18, 2021    (CN) .......................... 202110949592.1

(51) Int. Cl.
*C05G 5/18*    (2020.01)
*A01G 24/22*    (2018.01)
(Continued)

(52) U.S. Cl.
CPC .............. *C05G 5/18* (2020.02); *A01G 24/22* (2018.02); *A01G 24/40* (2018.02); *C05D 9/02* (2013.01); *C05F 11/00* (2013.01); *C05F 11/08* (2013.01)

(58) Field of Classification Search
CPC .......... C05G 5/18; A01G 24/40; A01G 24/22; C05D 9/02; C05F 11/00; C05F 11/08
See application file for complete search history.

(56) References Cited

U.S. PATENT DOCUMENTS

2014/0113821 A1    4/2014    Gu et al.

FOREIGN PATENT DOCUMENTS

| CN | 106174587 A | * 12/2016 |
| CN | 106613852 A | 5/2017 |

(Continued)

OTHER PUBLICATIONS

Lu Cao et al., "Activated-carbon-filled agarose hydrogel as a natural medium for seed germination and seedling growth" International Journal of Biological Macromolecules 177 (2021) 383-391 (Feb. 19, 2021).

*Primary Examiner* — Jiangtian Xu
(74) *Attorney, Agent, or Firm* — SZDC Law PC (57) ABSTRACT

The invention provides preparation of a selenium-water-soluble high-molecular polysaccharide hydrogel and use thereof. The preparation method includes: (1) water solution of polysaccharide and seleno-compound was prepared by heating the mixture with stirring; and (2) the solution was cooled with standing within shaped container to obtain the selenium-polysaccharide composite hydrogel. Plant seeds are sown on the surface of the composite hydrogel and cultivated to obtain selenium-rich plants. Shape-controllable hydrogel could be prepared by recycled hydrogel through high-temperature dissolution followed with cooling to realize the effective utilization of selenium in the hydrogel.

(Continued)

Compared with the traditional selenium enrichment method, current method showed advances in prevent of selenium pollution, which normally caused by the application of selenium fertilizers.

5 Claims, 7 Drawing Sheets

(51) Int. Cl.
*A01G 24/40* (2018.01)
*C05D 9/02* (2006.01)
*C05F 11/00* (2006.01)
*C05F 11/08* (2006.01)

(56) References Cited

FOREIGN PATENT DOCUMENTS

CN 107915850 A 4/2018
WO 2005096803 A1 10/2005

* cited by examiner

METHOD FOR PREPARING SELENIUM-WATER-SOLUBLE POLYSACCHARIDE HYDROGEL AND USE THEREOF IN SELENIUM ENRICHMENT IN PLANTS

This application is the National Stage Application of PCT/CN2021/123186, filed on Oct. 12, 2021, which claims priority to Chinese Patent Application No. 202110949592.1, filed on Aug. 18, 2021, which is incorporated by reference for all purposes as if fully set forth herein.

FIELD OF THE INVENTION

The present invention relates to the fields of chemical synthesis of polymers and agriculture, and specifically to preparation of a selenium-water-soluble polysaccharide hydrogel and use thereof in selenium enrichment in plants.

DESCRIPTION OF THE RELATED ART

Selenium is an essential trace element for human and animal growth and development, and has many important functions in scavenging free radicals, regulating the redox state, preventing cancers and enhancing human immunity. Selenium deficiency interferes with the metabolism of proteins, nucleic acids and polysaccharides, and causes cardiovascular and cerebrovascular diseases, Keshan disease and other diseases. However, selenium cannot by synthesized and stored in human. At present, selenium deficiency occurs in about 1 billion people worldwide, including China, northwestern Europe, New Zealand, Australia and some areas of the United States. In China, 70% of the areas suffer from selenium deficiency, and 30% of them are areas with severe selenium deficiency. China is one of the internationally recognized selenium-deficient countries. Average per capita intake of selenium in China is merely 14-21 micrograms, which is great far from the normal selenium demand in human body (the daily intake of selenium for adults is 50-250 micrograms, recommended by the Chinese Nutrition Society), causing health problems in more than 70 million Chinese people.

Selenium supplements mainly include dietary selenium supplement, selenium nutritional supplements and drugs. Dietary selenium supplement is a main source of selenium uptake in human due to the wide source, safety and convenience. To enhance the selenium uptake in human, the consumption of selenium-rich agricultural products, such as selenium-enriched radish and selenium-enriched rice, is a safe, efficient, and healthy approach.

Selenium enrichment in plants mainly includes natural selenium enrichment and artificial selenium enrichment. Natural selenium enrichment is a process in which an agricultural product is grown in soil with a high selenium content, so the plant absorbs selenium from the soil, and converts inorganic selenium into organic selenium through its own biological action. However, the selenium distribution in soil is not uniform during natural selenium enrichment, and generally in strip or dot distribution, causing the problems of low selenium content in some agricultural products and unbalanced selenium enrichment in products. Artificial selenium enrichment, for example, foliar application of selenium, and application of basal fertilizer, refers to the production of selenium-enriched agricultural products by exogenous addition of selenium during plant growth. Artificial selenium application can significantly improve the selenium content in agricultural products. However, in the case of artificial selenium application, the utilization is low, and the persistence is poor. The traditional selenium fertilizer will run away with the rain, causing selenium pollution, and posing safety hazards to the environment, plants and human beings. Therefore, there is an urgent need to explore a green, and effective selenium enrichment method in plants.

SUMMARY OF THE INVENTION

To solve the above problems, the present invention provides preparation of a selenium-water-soluble high-molecular polysaccharide hydrogel and use thereof in selenium enrichment in plants. A selenium-water-soluble high-molecular polysaccharide hydrogel is formed by mixing of a water-soluble high-molecular polysaccharide and a selenium-containing compound in an aqueous solution and by the physical cross-linking by the polysaccharide. The hydrogel is applicable to selenium enrichment in plants, and can be recycled, to avoid the problems of low selenium content in agricultural products and selenium pollution caused by traditional application of selenium fertilizers. Therefore, green selenium enrichment is realized.

In a first aspect, the present invention provides a method for preparing selenium-water-soluble high-molecular polysaccharide hydrogel, which comprises the following steps:
  step (1): adding a water-soluble high-molecular polysaccharide and a selenium-containing compound to water, and dissolving by heating with stirring, to obtain a mixed solution; and
  step (2): standing, cooling and molding the mixed solution, to obtain the selenium-water-soluble high-molecular polysaccharide hydrogel.

Preferably, the water-soluble high-molecular polysaccharide is selected from the group consisting of agarose, carrageenan, gelatin, konjac gum, Locust bean gum and any combination thereof.

Preferably, the selenium-containing compound is a water-soluble selenium-containing compound, and preferably selected from selenocarrageenin, sodium selenite and selenium yeast.

Preferably, the weight ratio of the water-soluble high-molecular polysaccharide to water is 1-10:100.

Preferably, the temperature for heating with stirring is 80-100° C.

Preferably, the heating with stirring is continued for 0.5-1 h.

Preferably, the cooling time is 12-24 h.

In a second aspect, the present invention provides a selenium-water-soluble high-molecular polysaccharide hydrogel prepared by the preparation method according to the first aspect.

In a third aspect, the present invention provides use of the selenium-water-soluble high-molecular polysaccharide hydrogel according to the second aspect in the selenium enrichment in plants.

Preferably, the selenium enrichment in plants comprises specifically: sowing a plant seed on the surface of the selenium-water-soluble high-molecular polysaccharide hydrogel, and cultivating under light, at a constant temperature and a constant humidity, to obtain a selenium-rich plant.

Preferably, the plant seed comprises selected from the group consisting of mung bean seed, rape seed, pea seed and any combination thereof.

Preferably, the concentration of selenium in the selenium-water-soluble high-molecular polysaccharide hydrogel is 400-1600 μg/L.

Preferably, the light is continuous light, with an intensity of 800-4000 LX; the constant temperature is 20-25° C.; and the constant humidity is 70%-80%.

Preferably, the cultivation time of plant seeds is preferably 5-15 days.

Preferably, after the selenium-enriched cultivation of plants, the selenium-water-soluble high-molecular polysaccharide hydrogel is dissolved at a high temperature, and cooled to form a hydrogel in a certain shape again, to recycle the selenium-water-soluble high-molecular polysaccharide hydrogel.

Compared with related art, the present invention has at least the following beneficial effects:

1. In the present invention, a water-soluble high-molecular polysaccharide and a selenium-containing compound is dissolved in an aqueous solution at a high temperature to obtain a uniformly mixed solution, from which a selenium-water-soluble high-molecular polysaccharide hydrogel is formed by the physical cross-linking by the water-soluble high-molecular polysaccharide after cooling. The preparation method is simple, and easy to operate, and the water-soluble high-molecular polysaccharide as a carrier is a green and environmentally friendly polymer material, having good biocompatibility and degradability.

2. The selenium-water-soluble high-molecular polysaccharide hydrogel prepared in the present invention is applicable to selenium enrichment in plants. Plant seeds are sown on the surface of the composite hydrogel, to cultivate a selenium-rich plant. This avoids the problem of selenium pollution caused by traditional selenium enrichment, and green selenium enrichment is realized.

3. After cultivating plants with the selenium-water-soluble high-molecular polysaccharide hydrogel, there is still a lot of selenium in the used hydrogel, due to the limited uptake of selenium in the hydrogel by plants. The selenium-water-soluble high-molecular polysaccharide hydrogel of the present invention has the characteristics of solid-liquid phase transition, and a hydrogel with a fixed shape can be reformed by dissolving at high temperature and then cooling down, and then recycled to achieve the efficient utilization of selenium in the hydrogel.

BRIEF DESCRIPTION OF THE DRAWINGS

FIG. 7 shows the effects of various forms of selenium and selenium concentrations in a selenium-agarose hydrogel on the accumulation and utilization of selenium in plants, in which FIGS. 7a-c show the effects of selenium concentration in various forms of selenium-agarose hydrogels on selenium content in plants, respectively; and FIGS. 7 d-f show the effect of selenium concentration on the utilization of selenium in various forms of selenium-agarose hydrogels, respectively.

FIG. 8 shows the effects of various forms of selenium in a selenium-agarose hydrogel on the kinetics of selenium accumulation in plants, in which: FIG. 8a shows a picture of growing mung bean sprouts; and FIGS. 8b-d are line charts showing the selenium content in mung bean sprouts cultivated with various forms of selenium-agarose hydrogels as a function of cultivation time;

DETAILED DESCRIPTION OF THE PREFERRED EMBODIMENTS

The present invention will be further described below with reference to the accompanying drawings and specific examples, so that those skilled in the art can better understand and implement the present invention; however, the present invention is not limited thereto.

Unless otherwise defined, all technical and scientific terms used herein have the same meaning as commonly understood by persons skilled in the art to which the present invention pertains. The terms used in the descriptions of the present invention are for the purpose of describing specific embodiments only and are not intended to limit the present invention. The term "and/or" as used herein includes any and all combinations of one or more of the listed related items.

Unless otherwise stated, the experimental methods given in examples below are all conventional methods. The materials, and reagents involved in the examples are commercially available, unless otherwise specified.

Example 1: Selenocarrageenin-Agarose Hydrogel 1 g of agarose (Agar), and 100 mL of deionized water were respectively added with various contents (0, 400, 800, 1200, and 1600 μg/L) of selenocarrageenin (SeCA) to a corresponding 500 mL flat-bottomed flask, then placed in an oil bath at 95° C., and stirred for 0.5 h until the solution was clear and transparent. At this time, agarose was substantially completely dissolved. The mixed solution of selenium and agarose was poured into a cylindrical mold, and then naturally cooled, to form selenium-agarose composite hydrogels with various selenium concentrations. The hydrogels with various selenium concentrations were designated as Agar (control), Agar/SeCA-Se (400 μg/L), Agar/SeCA-Se (800 g/L), Agar/SeCA-Se (1200 μg/L), and Agar/SeCA-Se (1600 μg/L).

Example 2: Sodium Selenite-Agarose Hydrogel 1 g of agarose (Agar), and 100 mL of deionized water were respectively added with various contents (0, 400, 800, 1200, and 1600 μg/L) of sodium selenite (Selenite) to a corresponding 500 mL flat-bottomed flask, then placed in an oil bath at 95° C., and stirred for 0.5 h until the solution was clear and transparent. At this time, agarose was substantially completely dissolved. The mixed solution of selenium and agarose was poured into a cylindrical mold, and then naturally cooled, to form selenium-agarose composite hydrogels with various selenium concentrations. The hydrogels with various selenium concentrations were designated as Agar (control), Agar/Selenite-Se (400 µg/L), Agar/Selenite-Se (800 µg/L), Agar/Selenite-Se (1200 µg/L), and Agar/Selenite-Se (1600 µg/L).

Example 3: Yeast Selenium-Agarose Hydrogel 1 g of agarose (Agar), and 100 mL of deionized water were respectively added with various contents (0, 400, 800, 1200, and 1600 µg/L) of selenium yeast (Se yeast) to a corresponding 500 mL flat-bottomed flask, then placed in an oil bath at 95° C., and stirred for 0.5 h until the solution was clear and transparent. At this time, agarose was substantially completely dissolved. The mixed solution of selenium and agarose was poured into a cylindrical mold, and then naturally cooled, to form selenium-agarose composite hydrogels with various selenium concentrations. The hydrogels with various selenium concentrations were designated as Agar (control), Agar/Se yeast-Se (400 µg/L), Agar/Se yeast-Se (800 µg/L), Agar/Se yeast-Se (1200 µg/L), and Agar/Se yeast-Se (1600 µg/L).

Sample Characterization

The selenium-agarose composite hydrogels in the above example were freeze dried in a freeze dryer, and a sample was taken for test by Fourier Transform Infrared Transform Spectroscopy (FT-TR) and X-ray powder diffraction (XRPD). The lyophilized samples were fractured in liquid nitrogen and tested by scanning electron microscopy (SEM).

Figure 1:
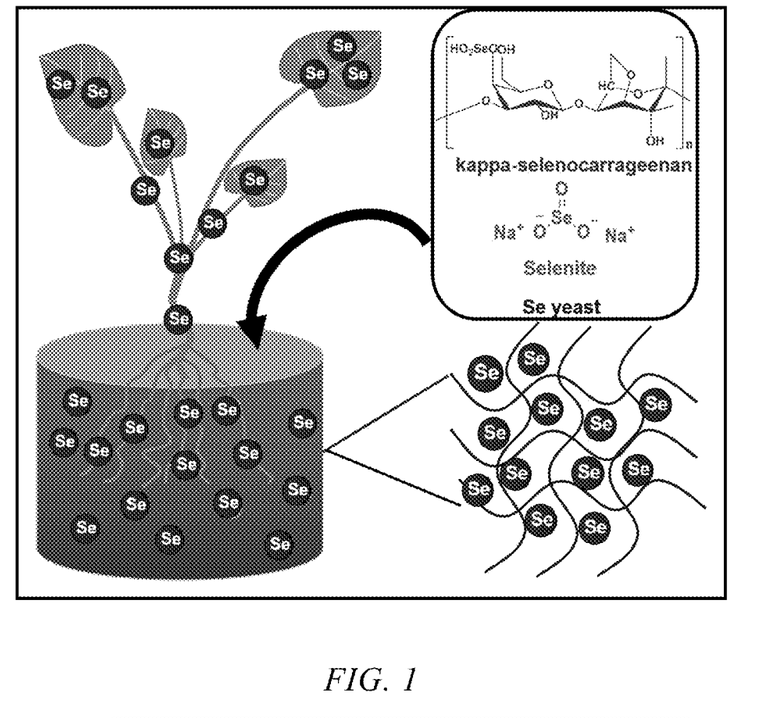
FIG. 1 shows the mechanism of selenium enrichment in plants.
Figure 2:
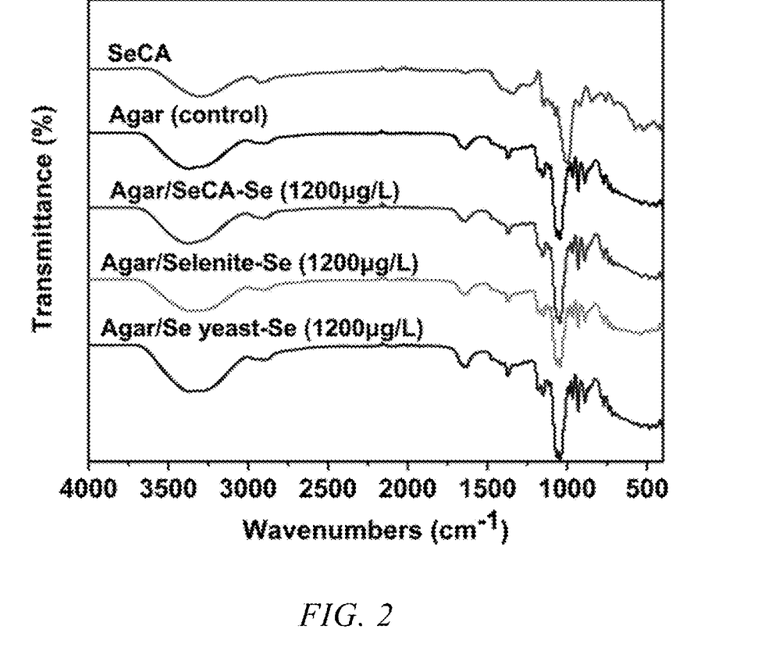
FIG. 2 shows IR spectra of SeCA, Agar (control), Agar/SeCA-Se (1200 μg/L), Agar/Selenite-Se (1200 μg/L), and Agar/Se yeast-Se (1200 μg/L)
Figure 3:
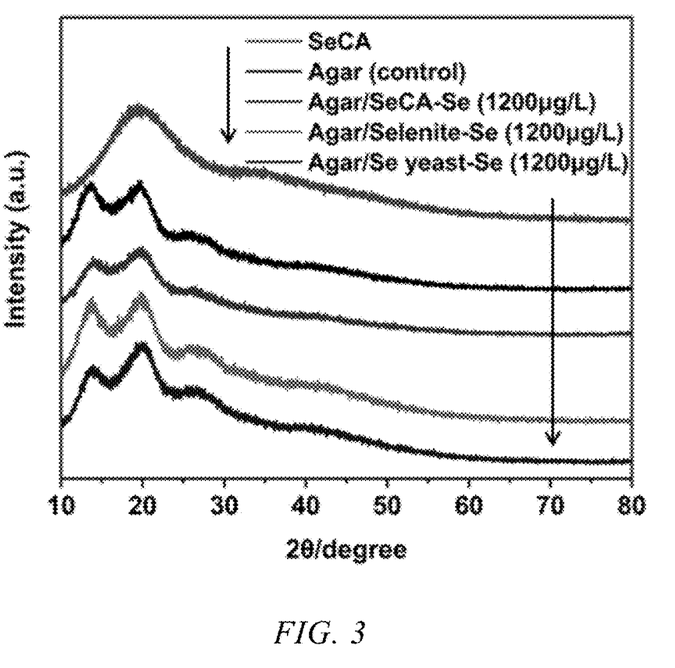
FIG. 3 shows X-ray diffraction patterns of SeCA, Agar (control), Agar/SeCA-Se (1200 μg/L), Agar/Selenite-Se (1200 μg/L) and Agar/Se yeast-Se (1200 μg/L)
Figure 4:
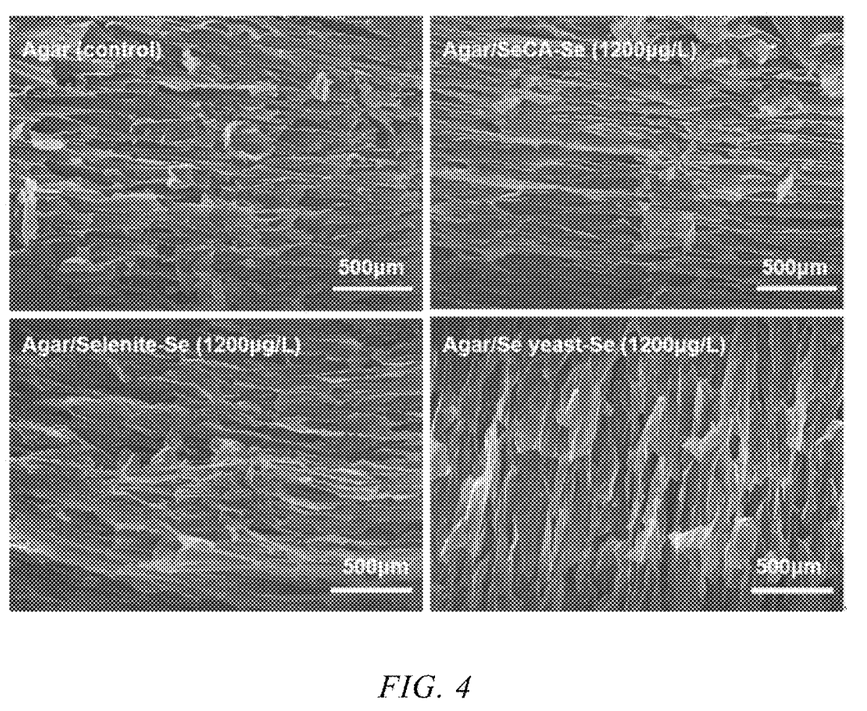
FIG. 4 shows SEM images of Agar (control), Agar/SeCA-Se (1200 μg/L), Agar/Selenite-Se (1200 μg/L) and Agar/Se yeast-Se (1200 μg/L)

FIGS. 2 to 4 respectively show the IR spectra, X-ray diffraction patterns, and cross-sectional SEM images of SeCA, Agar (control), Agar/SeCA-Se (1200 g/L), Agar/Selenite-Se (1200 µg/L) and Agar/Se yeast-Se (1200 µg/L). The test results show that the FTIR spectra and XRPD patterns of agarose hydrogel and various forms of selenium-agarose composite hydrogel are quite similar, Therefore, it is speculated that the introduction of various forms of selenium does not causes chemical modification of the high-molecular polysaccharide. Moreover, as can be seen from the SEM image shown in FIG. 4, both agarose hydrogel and selenium-agarose composite hydrogel have abundant pore structures.

Use in Selenium Enrichment in Plants

Mung bean seeds were evenly sown on the surface of agarose hydrogel and selenium-agarose composite hydrogels of various forms and concentrations prepared in Examples 1-3, and cultivated under light in an incubator. Cultivation conditions: LED light source with an intensity of 800 LX, 25° C., 80% humidity. After seven days of cultivation, mung bean sprouts were harvested, and the biomass of the plant was determined. Then, the plant was dried in an oven at 80° C. to a constant dryness, and then the selenium content was determined.

Figure 5:
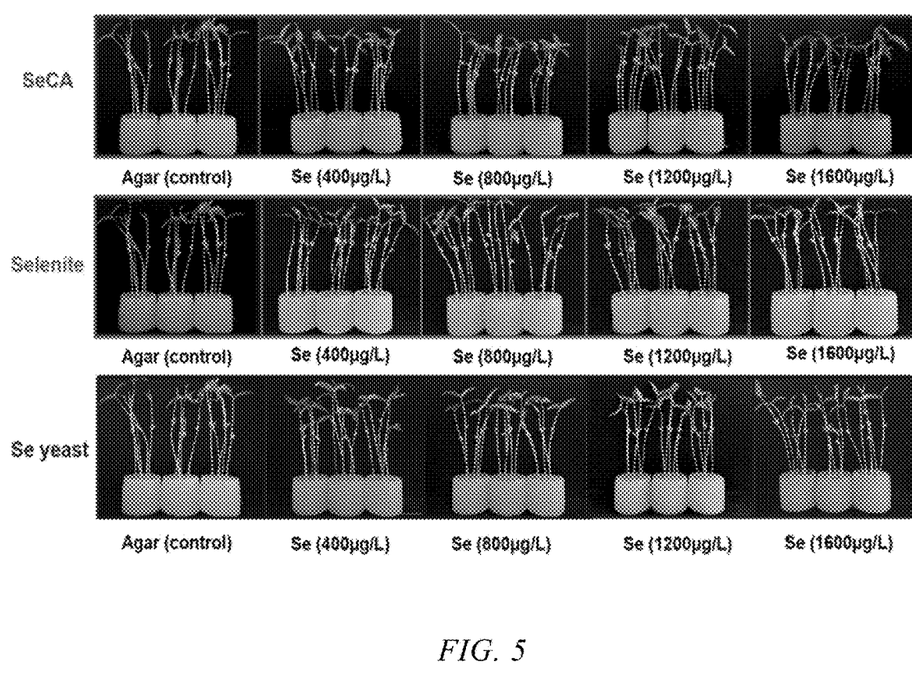
FIG. 5 shows pictures of mung bean sprouts cultivated for 7 days on the surface of selenium-agarose hydrogels prepared with various forms of selenium compounds at various concentrations.
Figure 6:
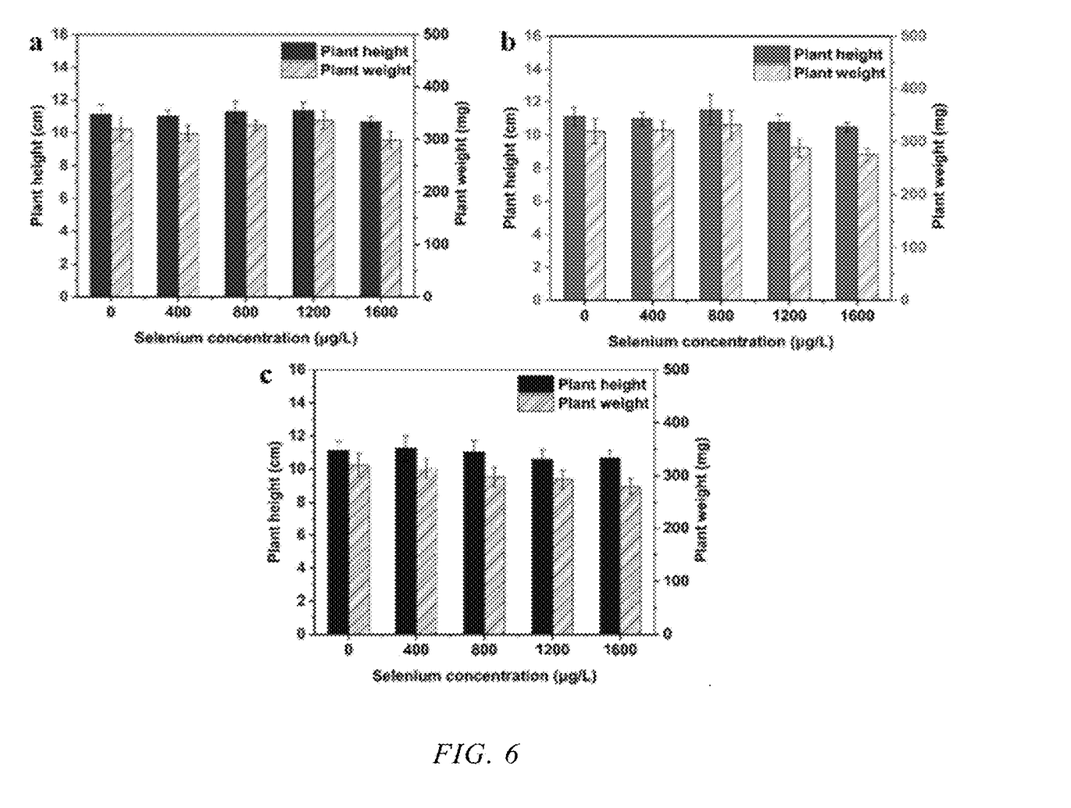
FIG. 6 compares the growth height and the weight after drying of mung bean sprouts cultivated for 7 days on the surface of selenium-agarose hydrogels prepared with various forms of selenium compounds at various concentrations, in which Panels a-c corresponds to Agar/SeCA-Se, Agar/Selenite-Se and Agar/Se yeast-Se respectively.

Mung bean sprouts cultivated with various hydrogels for 7 days are shown in FIG. 5. The plant height and dry weight of the corresponding mung bean sprouts are shown in FIG. 6. FIGS. 6*a-c* compares the plant height and dry weight of mung bean sprouts cultivated with selenocarrageenin-agarose hydrogels, sodium selenite-agarose hydrogels, and selenium yeast-agarose hydrogels of various selenium concentrations for 7 days. As can be seen from the comparison results, the selenium concentration in selenocarrageenin-agarose hydrogel and selenium yeast-agarose hydrogel has no obvious impact on the growth of mung bean sprouts. When the selenium concentration in sodium selenite-agarose hydrogel is 0-800 µg/L, the growth of mung bean sprouts is promoted to a certain extent; however, as the selenium concentration rises to 1600 µg/L, the growth of mung bean sprouts is inhibited to a certain extent.

Figure 7:
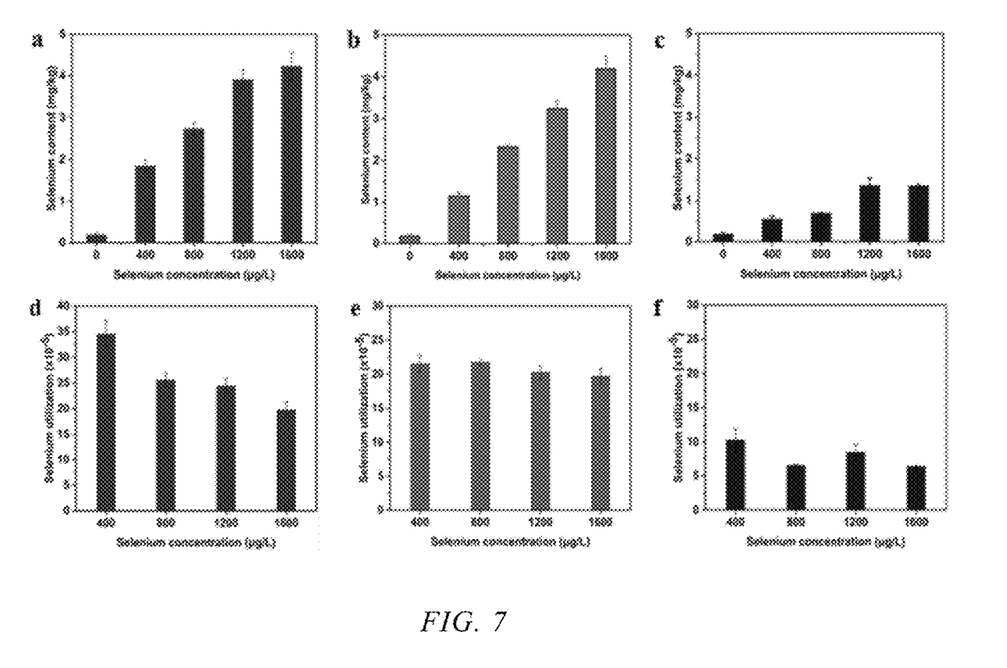

Moreover, the selenium content in mung bean sprouts was determined by inductively coupled plasma mass spectrometry (ICP-MS). The test results are shown in FIG. 7. FIGS. 7*a-c* shows the selenium content in mung bean sprouts cultivated for 7 days with selenocarrageenin-agarose hydrogels, sodium selenite-agarose hydrogels, and yeast selenium-agarose hydrogels of various concentrations (weight of selenium per kilogram of dried mung bean sprouts was tested); FIGS. 7*d-f* shows the ratio of selenium content in mung bean sprouts cultivated for 7 days with selenocarrageenin-agarose hydrogels, sodium selenite-agarose hydrogels, and yeast selenium-agarose hydrogel to selenium content in corresponding hydrogel (the ratio of selenium content in 1 kg of dried plants to the total amount of selenium in the hydrogel). As can be seen, the absorption for selenium as selenocarrageenin and sodium selenite hydrogels by mung bean sprouts is better than that for selenium yeast. It can be seen from FIGS. 7D-f that in various forms of selenium-agarose hydrogels with a lower selenium concentration of 400 µg/L, the utilization of selenium is higher. The selenium contents in mung bean sprouts cultivated with various forms of selenium-agarose hydrogels at various concentrations (400-1600 µg/L) are far greater than that in mung bean sprouts cultivated in pure agarose hydrogel, and selenium-rich mung bean sprouts are obtained.

Figure 8:
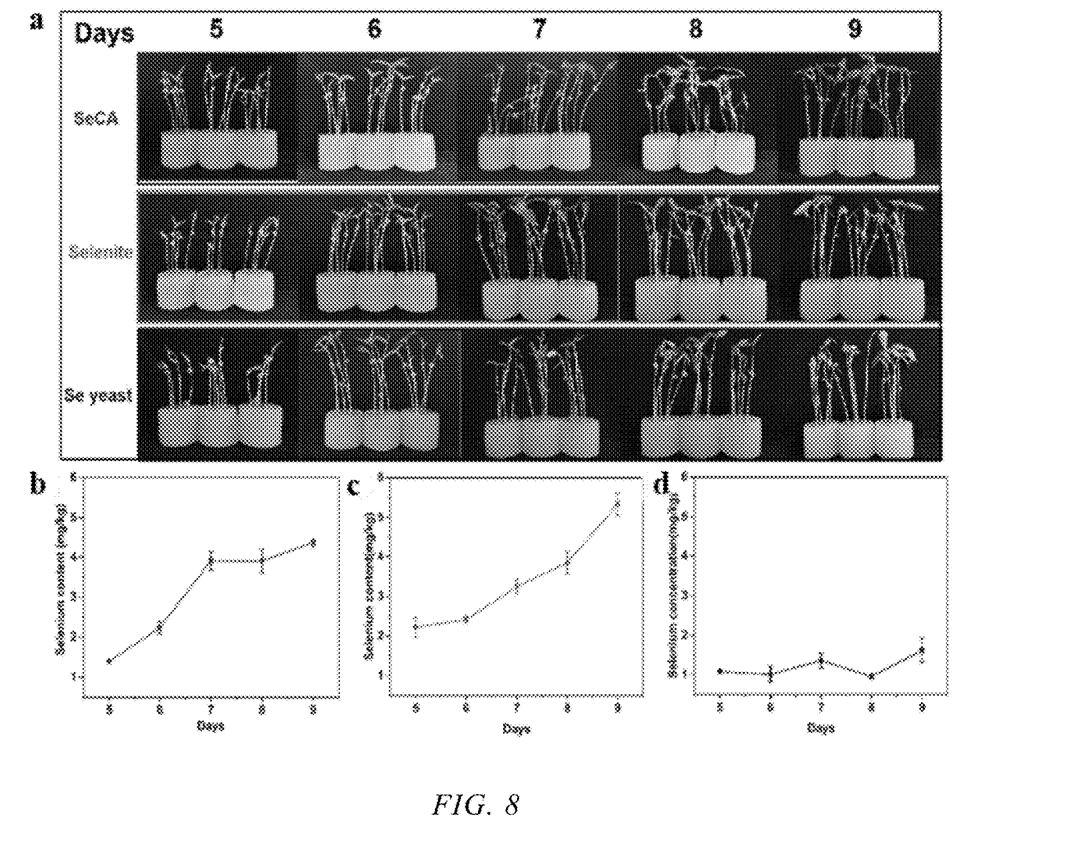

The effect of various forms of selenium in selenium-agarose hydrogels on the kinetics of selenium accumulation in cultivated mung bean sprouts was further investigated. The selenium contents accumulated in mung bean sprouts on days 5-9 of cultivation with Agar/SeCA-Se, Agar/Selenite-Se, and Agar/Se yeast-Se composite hydrogel having a selenium concentration of 1200 µg/L were studied. The growth changes of and the accumulation of selenium in mung bean sprouts are shown in FIG. 8, in which: FIG. 8*a* shows pictures of mung bean sprouts cultivated on various forms of selenium-agarose hydrogels on days 5-9, respectively; and FIGS. 8*b-d* shows contents of selenium determined in mung bean sprouts cultivated on various forms of selenium-agarose hydrogels on days 5-9, respectively. From the test results, it can be seen that with the extension of cultivation time, on day 9, mung bean sprouts cultivated with Agar/Selenite-Se has the highest selenium content, followed by Agar/SeCA-Se; and mung bean sprouts grown on Agar/Se yeast-Se has the lowest selenium content and the selenium content varies slightly during the 5-9 days of the test.

Recycled Use of Selenium-Water-Soluble High-Molecular Polysaccharide Hydrogel

1200 µg/L of used Agar/SeCA-Se composite hydrogel was into a 500 mL flat-bottomed flask, then placed in an oil bath at 95° ° C., and stirred for 0.5 h until the solution was clear and transparent. The solution was poured into a cylindrical mold, and then naturally cooled, to form a selenocarrageenin-agarose composite hydrogel. The resulting composite hydrogel is still applicable to the selenium enrichment in plants.

Figure 9:
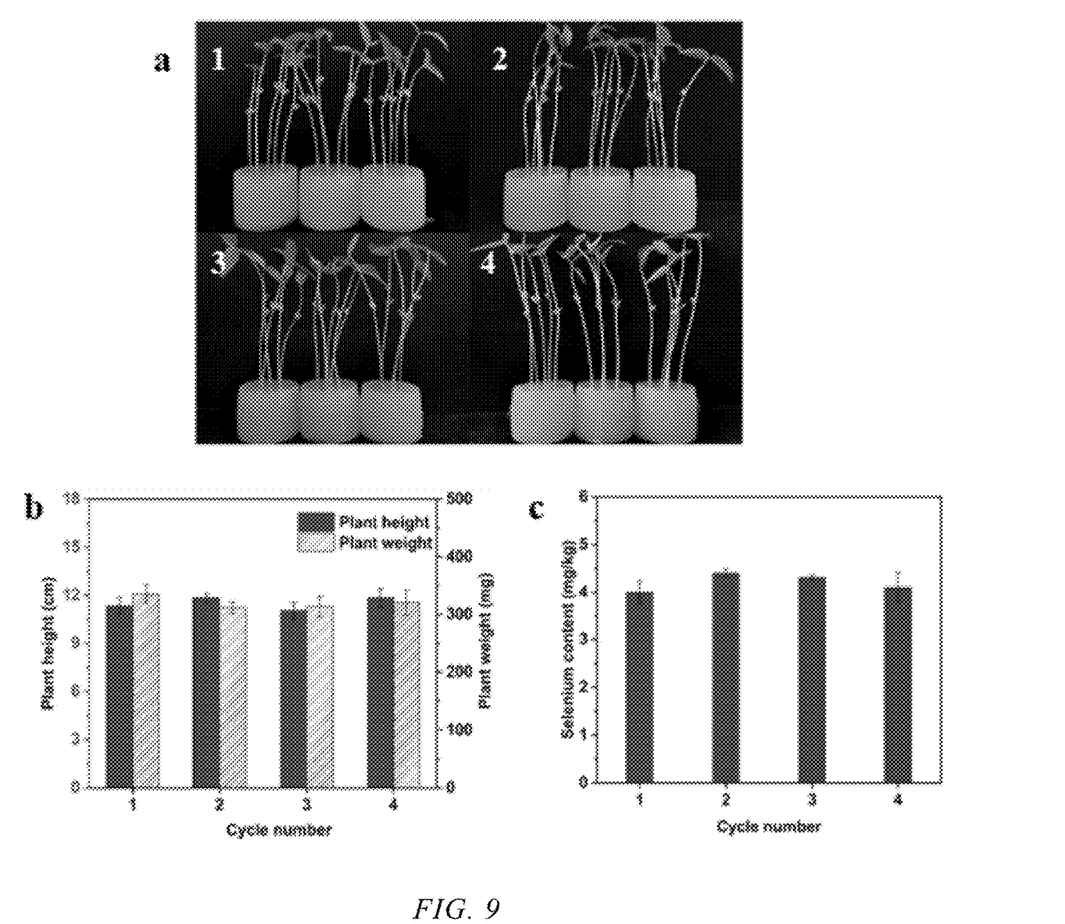
FIG. 9 shows recycled use of a selenocarrageenin-agarose hydrogel in the selenium enrichment in plants, in which: Fig. a shows a picture of mung bean sprouts cultivated with a selenocarrageenin-agarose hydrogel cyclically used 1-4 times; Fig. b shows the effect of the number of cycles on the growth height and weight of the cultivated mung bean sprouts; and Fig. c shows the effect of the number of cycles on the selenium content in the cultivated mung bean sprouts.

FIG. 9 shows the selenium-enriched plants and the heights, weights and selenium contents of the plants cultivated with Agar/SeCA-Se (1200 µg/L) composite hydrogel cyclically used 1 to 4 times. FIG. 9a shows mung bean sprouts cultivated with the composite hydrogel that is cyclically used different times. As can be seen, the recycled selenium-agarose hydrogel can still support plant growth. The plant height, plant weight, and selenium content in mung bean sprouts cultivated with the composite hydrogel that is cyclically used different times on day 7 of the cultivation are determined. The result is shown in FIG. 9b. As shown in FIG. 9c, each parameter has no obvious change. This is because the absorption of selenium in the hydrogel by plants is limited, and the selenium content in the hydrogel after recycled use still meets the demand of selenium enrichment in plants. The efficient utilization of selenium in hydrogel can be achieved through the recycling of hydrogel.

In summary, by cultivating mung bean sprouts with the selenium-water-soluble high-molecular polysaccharide hydrogel, selenium-enriched mung bean sprouts are obtained. The absorption of selenium by plants depends on the type and concentration of selenium compounds. The absorption for selenium in the form of selenocarrageenin and sodium selenite hydrogels by mung bean sprouts is better than that for selenium yeast. Moreover, the selenium-water-soluble high-molecular polysaccharide hydrogel of the present invention can be recycled by dissolving at a high temperature, and then molding by cooling and solidifying. The composite hydrogel recycled 4 times can still support plant growth, to achieve the selenium enrichment in plants.

The above-described embodiments are merely preferred embodiments for the purpose of fully illustrating the present invention, and the scope of the present invention is not limited thereto. Equivalent substitutions or modifications can be made by those skilled in the art based on the present invention, which are within the scope of the present invention as defined by the claims. The scope of the present invention is defined by the appended claims.

What is claimed is:

1. A method for preparing a selenium-water-soluble polysaccharide hydrogel, consisting of steps of:
   step (1): adding a water-soluble polysaccharide and a selenium-containing compound to water, and dissolving by heating with stirring, to obtain a mixed solution; and
   step (2): standing, cooling and molding the mixed solution, to obtain the selenium-water-soluble polysaccharide hydrogel.

2. The method for preparing a selenium-water-soluble polysaccharide hydrogel according to claim 1, wherein the water-soluble polysaccharide is selected from the group consisting of agarose, carrageenan, gelatin, konjac gum, Locust bean gum and any combination thereof; and a weight ratio of the water-soluble high-molecular polysaccharide to water is 1-10:100.

3. The method for preparing a selenium-water-soluble polysaccharide hydrogel according to claim 1, wherein the selenium-containing compound is selected from selenocarrageenin, sodium selenite and selenium yeast.

4. The method for preparing a selenium-water-soluble polysaccharide hydrogel according to claim 1, wherein a temperature for heating with stirring is 80-100° C.; and the heating with stirring is continued for 0.5-1 h.

5. The method for preparing a selenium-water-soluble polysaccharide hydrogel according to claim 1, wherein the cooling time is 12-24 h.

* * * * *